May 12, 1936.  H. E. C. COUSINS  2,040,202

VEHICLE BRAKE

Filed Nov. 11, 1935

Inventor
Henry E. C. Cousins
by Mawhinney & Mawhinney
Attorneys.

Patented May 12, 1936

2,040,202

UNITED STATES PATENT OFFICE 2,040,202

VEHICLE BRAKE

Henry Edward Cecil Cousins, Abingdon-on-Thames, England, assignor of one-half to The M. G. Car Company Limited, Abingdon-on-Thames, England Application November 11, 1935, Serial No. 49,302
In Great Britain March 24, 1934

4 Claims. (Cl. 188—78)

This invention relates to vehicle brakes, particularly to the kind having pivotally-mounted shoes and floating actuating means for thrusting them into contact with opposite sides of the internal periphery of a brake drum.

The main object of the invention is to provide an improved actuating means which will ensure substantially equal operation of the shoes and will be very frictionless.

According to one feature of the invention, each of the shoes is acted upon through its own individual cam, both cams being simultaneously operable by the co-operating elements of a Bowden-type control.

According to a further feature of the invention, individual cams, for each of a pair of brake shoes, respectively, are supported from rollers which are spring pressed into rolling contact with one another and are simultaneously rotatable in opposite directions to effect actuation of the brake shoes. The cams can consist of flats formed at the bottom of grooves in the rollers.

In the accompanying drawing:—

Figure 1:
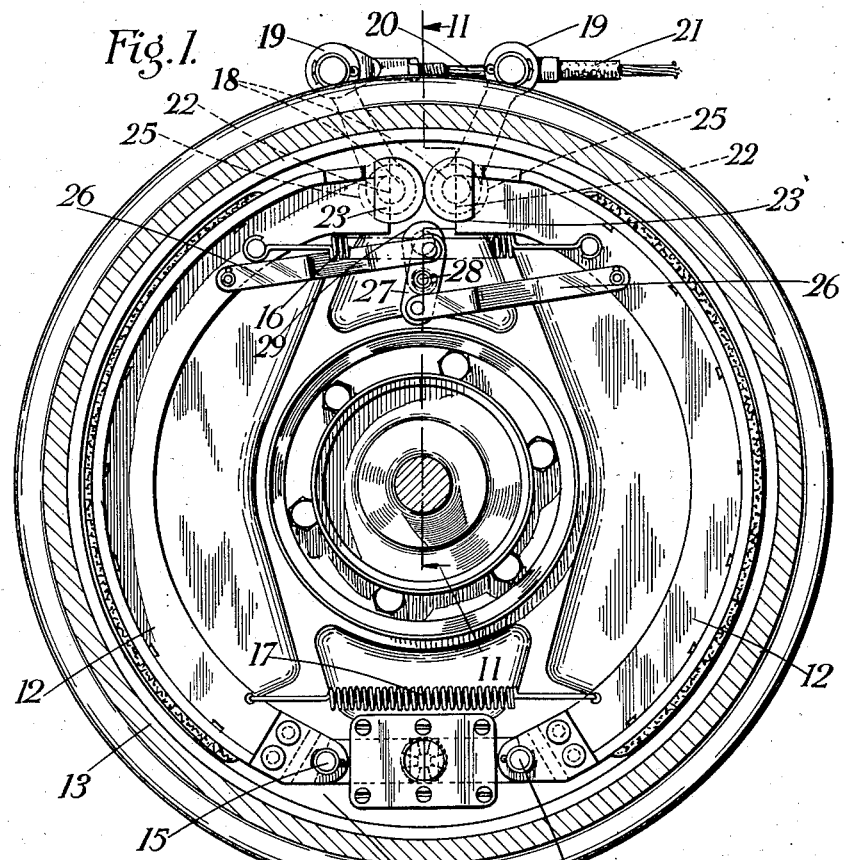
Figure 1 is an elevation, with the drum broken away, of one form of brake according to the invention.
Figure 2:
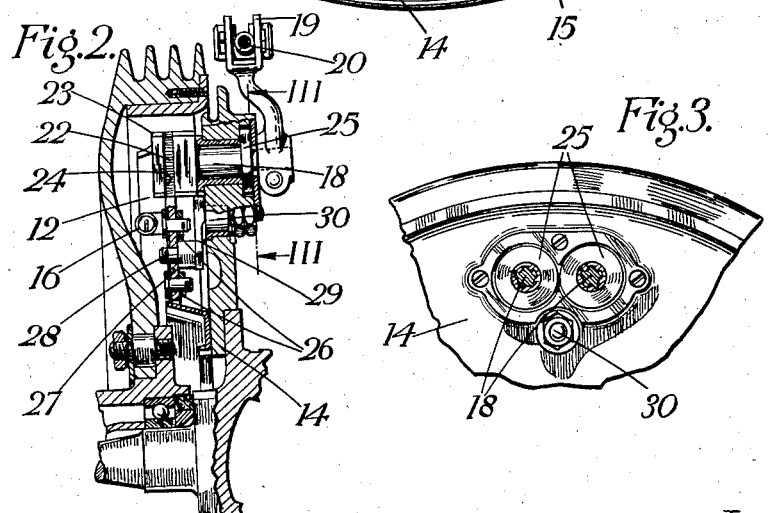
Figure 2 is a cross-section taken on the line II—II of Figure 1.
Figure 3:
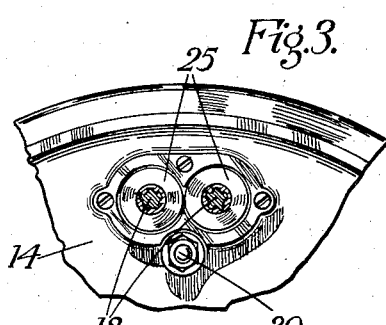
Figure 3 is a fragmentary view taken on the line III—III of Figure 2.

In the construction illustrated, as applied to the brake of a motor-car, there is a pair of brake shoes 12, 12 operating against the interior surface of a brake drum 13, the shoes being pivotally mounted at adjacent ends on an anchor plate 14 by means providing for the adjustment of the pivots 15 away from one another to take up wear occurring in the brake. (Such means, being well known, are not specifically described here.) The other ends of the shoes are associated with individual floating cams which are rotatable in opposite directions to thrust the shoes outwardly. Tension springs 16, 17 are arranged across these later to hold the brake off in a well understood manner.

The cam spindles 18, 18 carry arms 19 which are oppositely inclined to the plane that incorporates the main axes of the cam spindles. The arms are connected so as to be movable towards or away from one another in unison (whereby to rotate the cams in opposite directions) by means of a Bowden mechanism, the cable 20 of this being connected to one of the arms and the casing 21 to the other. The control of the Bowden mechanism (not shown) is such that the brake-applying force is distributed substantially equally between the casing and cable both of which are free to move.

A preferred arrangement of cam consists of a flat 22 formed in a D-shaped roller 23, the flat engaging the end of the associated brake shoe or of a part connected thereto. Preferably the flat is at the bottom of a groove 24 formed in the roller. The two rollers, which are arranged beside one another, are urged by the adjacent brake pull-off spring 16 into contact and when the brake is applied they roll upon one another with a minimum of friction. Conveniently the spindles 18 on which the rollers are fast extend with clearance through the anchor plate and carry outside, or in a recess in, the anchor plate a second pair of contacting rollers, 25, 25, the arms 19 being beyond these. The mounting of the spindles with a clearance through the anchor plate thus floats the spindles and the rollers mounted thereon relative to the anchor plate. The spindles may be located against endwise movement in any convenient manner.

For ensuring a correct initial setting of the brake shoes—i. e., that they remain properly centered relatively to the drum when the brake is off—they are conveniently connected near their free ends by links 26, 26 to the opposite ends of a one-to-one rocking lever 27 freely fulcrumed between its ends on a pin 28 carried by a crank arm 29. The latter is journalled in the anchor plate at 30 and it is secured therein relatively tightly but so that it can twist slightly about its pivotal axis when sufficient force is applied. If the brake be applied and one shoe should engage the brake drum materially before the other, not only does the rocking lever 27 turn freely about its fulcrum pin 28 during this but the latter fast on the crank arm 29 moves as necessary to centralize the shoes. Thereafter the fulcrum pin 28 remains in this new position until, owing to wear occurring or for any other reason, it is again automatically reset as described. The relative immobility of the fulcrum 28 prevents the system from rocking as a whole about the brake shoe pivots 15 when the brake is off. The initial setting mechanism just described being the joint invention of the present applicant Cousins and Hubert N. Charles is not claimed herein but is claimed in a copending joint application Serial No. 30,900 filed July 11, 1935.

Thus, by means of the invention, a substantially equal operation of the shoes can be ensured and the actuating means is very frictionless. In addition, the oscillation of the movable system, when the brake is off, can be prevented.

What I claim as my invention and desire to secure by Letters Patent of the United States is:—

1. A vehicle brake comprising a brake drum, a pair of brake shoes movable into contact with opposite sides of the internal periphery of said brake drum, individual cams for actuating said brake shoes, respectively, said cams being fast with rollers, said cams and rollers being floatingly mounted, means biassing said rollers into rolling contact with one another, and means for simultaneously rotating said rollers in opposite directions.

2. A vehicle brake comprising a brake drum, a pair of brake shoes movable into contact with opposite sides of the internal periphery of said brake drum, individual cams for actuating said brake shoes, respectively, each of said cams consisting of a flat at the bottom of a groove in a roller, said brake shoes having parts which enter the grooves, and means biassing said rollers into rolling contact with one another.

3. A vehicle brake comprising a brake drum, a pair of brake shoes movable into contact with opposite sides of the internal periphery of said brake drum, individual cams for actuating said brake shoes, respectively, spindles carrying said cams, each of said spindles having near each end a roller, and means biassing the pairs of rollers on said spindles into rolling contact with one another.

4. A vehicle brake comprising an anchor plate, a brake drum, a pair of brake shoes movable into contact with opposite sides of the internal periphery of said brake drum, individual cams for actuating said brake shoes, respectively, spindles carrying said cams, rollers carried by said spindles, said spindles extending through said anchor plate with clearance and being endwise located therein, and means biassing said rollers into rolling contact with one another.

HENRY EDWARD CECIL COUSINS.